US012753334B2

(12) United States Patent
Tanabe et al.

(10) Patent No.: US 12,753,334 B2
(45) Date of Patent: Oct. 6, 2026

(54) TEMPORARY ADHESIVE MATERIAL FOR SUBSTRATE PROCESSING AND METHOD FOR MANUFACTURING LAMINATE

(71) Applicant: SHIN-ETSU CHEMICAL CO., LTD., Tokyo (JP)

(72) Inventors: Masahito Tanabe, Annaka (JP); Michihiro Sugo, Takasaki (JP); Hiroyuki Yasuda, Tomioka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 307 days.

(21) Appl. No.: 17/624,471

(22) PCT Filed: Jul. 9, 2020

(86) PCT No.: PCT/JP2020/026818

§ 371 (c)(1),
(2) Date: Jan. 3, 2022

(87) PCT Pub. No.: WO2021/006311

PCT Pub. Date: Jan. 14, 2021

(65) Prior Publication Data

US 2022/0372353 A1 Nov. 24, 2022

(30) Foreign Application Priority Data

Jul. 11, 2019 (JP) ................................ 2019-129071

(51) Int. Cl.
*B32B 41/00* (2006.01)
*C09J 5/06* (2006.01)
(Continued)

(52) U.S. Cl.
CPC ............... *C09J 183/06* (2013.01); *C09J 5/06* (2013.01); *C09J 7/10* (2018.01); *C09J 7/35* (2018.01);
(Continued)

(58) Field of Classification Search
CPC ..... C09J 183/06; C09J 5/06; C09J 7/10; C09J 7/35; C09J 11/04; C09J 2203/326;
(Continued)

(56) References Cited

U.S. PATENT DOCUMENTS

2005/0233547 A1 10/2005 Noda et al.
2013/0220687 A1 8/2013 Tagami et al.
(Continued)

FOREIGN PATENT DOCUMENTS

CN 105470188 A 4/2016
CN 105733498 A 7/2016
(Continued)

OTHER PUBLICATIONS

Jun. 12, 2023 extended Search Report issued in European Patent Application No. 20836277.2.
(Continued)

*Primary Examiner* — Michael N Orlando
*Assistant Examiner* — Joshel Rivera
(74) *Attorney, Agent, or Firm* — Oliff PLC

(57) ABSTRACT

A temporary adhesive material for substrate processing adhesion to support the substrate opposite to a surface, the material including: a first temporary adhesive layer; and a second temporary adhesive layer distinct from the first layer, where at least one of the first layer and the second layer has a minimum viscosity of 1 Pa·s or higher and 10,000 Pa·s or lower within 130° C. to 250° C., where: the temporary adhesive material contains 10 parts by mass or more and 100 parts by mass or less of a siloxane bond-containing polymer having a weight-average of 3,000 or more and 700,000 or less as measured by GPC based on a total mass of 100 parts. A temporary material for substrate processing that facilitates the adhesion and separation, allows a quick layer formation, has dimensional resistance to thermal processes, and can
(Continued)

raise the productivity of substrates; and manufacturing a laminate using the same.

5 Claims, 1 Drawing Sheet

(51) Int. Cl.
*C09J 7/10* (2018.01)
*C09J 7/35* (2018.01)
*C09J 11/04* (2006.01)
*C09J 183/06* (2006.01)

(52) U.S. Cl.
CPC .......... *C09J 11/04* (2013.01); *C09J 2203/326* (2013.01); *C09J 2301/304* (2020.08); *C09J 2301/408* (2020.08)

(58) Field of Classification Search
CPC ............ C09J 2301/304; C09J 2301/408; C09J 183/14; C09J 2301/208; C09J 2301/312; C09J 2483/00; C09J 183/04; C09J 153/025; C09J 7/30; C08G 77/52; C08G 77/08; C08G 77/14; H01L 21/6835; H01L 2221/68327; H01L 2221/6834; H01L 21/6836; H01L 21/304; H01L 21/683
USPC .................... 156/60, 64, 350, 351, 378, 379
See application file for complete search history.

(56) References Cited

U.S. PATENT DOCUMENTS

2013/0302983 A1* 11/2013 Tanabe ........................ C09J 7/35 438/759
2014/0154868 A1 6/2014 Sugo et al.
2014/0342530 A1* 11/2014 Yasuda ............... H01L 21/6835 428/355 R
2015/0353793 A1 12/2015 Yasuda et al.
2016/0093522 A1 3/2016 Tagami et al.
2016/0189996 A1 6/2016 Tanabe et al.
2016/0189998 A1 6/2016 Yasuda et al.
2016/0326414 A1 11/2016 Tagami et al.
2017/0004989 A1 1/2017 Tanabe et al.
2017/0053821 A1 2/2017 Sugo et al.
2017/0069521 A1 3/2017 Sugo et al.
2017/0101555 A1 4/2017 Yasuda et al.
2017/0154801 A1* 6/2017 Tagami .................. C09J 183/10
2018/0350650 A1* 12/2018 Tanabe ........................ C09J 7/10
2019/0027391 A1 1/2019 Tagami et al.

FOREIGN PATENT DOCUMENTS

CN 105742194 A 7/2016
CN 106104765 A 11/2016
CN 106318291 A 1/2017
CN 108977117 A 12/2018
EP 3 038 148 A1 6/2016
EP 3 121 838 A1 1/2017
EP 3133641 A1 * 2/2017 ............. B32B 27/06
EP 3 154 080 A1 4/2017
EP 3 174 091 A1 5/2017
JP 2004-064040 A 2/2004
JP 2013-179135 A 9/2013
JP 2014-131004 A 7/2014
JP 2016-072612 A 5/2016
JP 2017-013311 A 1/2017
JP 6059631 B2 1/2017
JP 2017-039912 A 2/2017
JP 2018-203880 A 12/2018
TW 201625410 A 7/2016
TW 201713743 A 4/2017
TW 201903092 A 1/2019
WO 2015/115060 A1 8/2015
WO 2017191815 A1 11/2017
WO WO-2019028015 A1 * 2/2019 ............ C09J 183/04

OTHER PUBLICATIONS

May 24, 2022 Notification of Reasons for Refusal issued in Japanese Patent Application No. 2019-129071.
Nov. 22, 2022 Office Action issued in Japanese Patent Application No. 2019-129071.
Sep. 24, 2020 International Search Report issued in International Patent Application No. PCT/JP2020/026818.
Jan. 11, 2022 International Preliminary Report on Patentability issued in International Patent Application No. PCT/JP2020/026818.
Sep. 21, 2023 Office Action issued in Taiwanese Patent Application No. 109123167.
Feb. 15, 2023 Office Action issued in Chinese Patent Application No. 202080049294.0.
Oct. 20, 2023 Office Action issued in Chinese Patent Application No. 202080049294.0.
Jul. 12, 2023 Office Action issued in Chinese Patent Application No. 202080049294.0.
Apr. 25, 2023 Office Action issued in Japanese Patent Application No. 2019-129071.
Feb. 20, 2024 Office Action issued in Japanese Application No. 2023-3027.
Mar. 15, 2024 Office Action issued in Taiwanese Application No. 109123167.
Jul. 17, 2024 Office Action issued in Chinese Application No. 202080049294.0.
"Adhesive for Metal", edited by Zhang Yulong et al, China Petrochemical Press, (May 2004).
Jul. 30, 2024 Decision of Refusal in Taiwanese Application No. 109123167.
Sep. 3, 2024 Notification of Reasons for Refusal issued in Japanese Application No. 2023-103707.
Aug. 17, 2024 Office Action issued in Korean Application No. 10-2022-7000111.
Oct. 25, 2024 Office Action issued in Chinese Application No. 202080049294.0.
May 2, 2025 Office Action issued in European Application No. 20836277.2.
Dec. 15, 2025 Office Action issued in Taiwanese Patent Application No. 109123167.

* cited by examiner

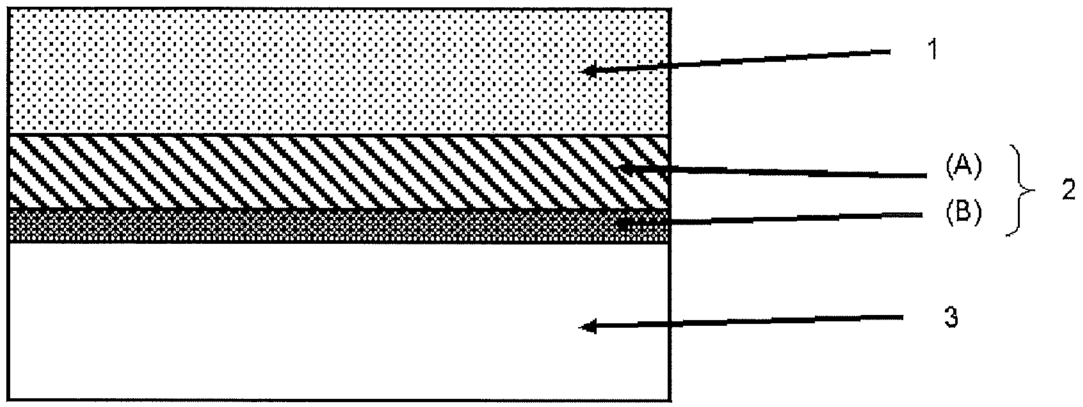
1
(A)
(B)
2
3

TEMPORARY ADHESIVE MATERIAL FOR SUBSTRATE PROCESSING AND METHOD FOR MANUFACTURING LAMINATE

TECHNICAL FIELD

The present invention relates to: a temporary adhesive material for substrate processing; and a method for manufacturing a laminate using the temporary adhesive material for substrate processing.

BACKGROUND ART

Three-dimensional semiconductor mounting has become essential for higher density and larger capacity. The three-dimensional mounting technique is a semiconductor production technique for thinning a semiconductor chip and connecting the chip to another chip by a through silicon via (TSV) electrode to form a multilayer. Realizing this requires steps of thinning a substrate by grinding a non-circuit-forming surface (also referred to as "back surface") of the substrate on which a semiconductor circuit has been formed, followed by forming an electrode including a TSV on the back surface.

In the step of grinding the back surface of a silicon substrate, a protective tape is conventionally attached to a surface opposite to the surface to be ground to prevent the wafer from breaking during grinding. However, this tape uses an organic resin film as the base material, which has flexibility, but inadequate strength and heat resistance. Thus, this tape is not suited to the steps of forming a TSV and forming a wiring layer on the back surface.

In this context, there has been suggested a system of bonding a semiconductor substrate to a support made of silicon, glass or the like via an adhesive layer, making it possible to sufficiently withstand the steps of grinding the back surface and forming a TSV and an electrode on the back surface. The key to this system is the adhesive layer used for bonding the substrate to the support. The adhesive layer is required to have sufficient durability to bond the substrate to the support without gaps and to withstand subsequent steps, and is also required to allow the thin substrate to be easily separated from the support finally. As described above, this adhesive layer is finally removed and is referred to as "temporary adhesive layer" (or temporary adhesive material layer) in this description.

With respect to the conventionally known temporary adhesive layer and a method for removing this layer, the following techniques have been proposed: an adhesive material containing a light-absorbing substance is irradiated with high intensity light to decompose the adhesive material layer whereby the adhesive material layer is removed from the support (Patent Document 1); and a heat fusible hydrocarbon compound is used for the adhesive material, and bonding and removal are carried out in a heat-molten state (Patent Document 2). The former technique has problems of requiring expensive tools such as laser, a long treatment time per substrate, and so forth. The latter technique is simple because of control only by heat, but thermal stability is insufficient at a high temperature exceeding 200° C., and thus the applicable range is limited. Furthermore, these temporary adhesive layers are not adequate to form a film with uniform thickness on a heavily stepped substrate and to provide a complete adhesion to the support. Nevertheless, the substrate and the support cannot be separated in subsequent steps, and the substrate is often damaged.

CITATION LIST

Patent Literature

Patent Document 1: JP 2004-64040 A
Patent Document 2: JP 6059631 B

SUMMARY OF INVENTION

Technical Problem

The present invention has been accomplished in view of the above-described problems. It is an object of the present invention to provide: a temporary adhesive material for substrate processing which facilitates temporary adhesion between a substrate and a support, rapidly forms a temporary adhesive material layer on a substrate or a support, has excellent dimensional resistance and excellent resistance to a thermal process such as CVD (chemical vapor deposition), and is easily separated to improve the productivity of laminates; and a method for manufacturing a laminate using the temporary adhesive material for substrate processing.

Solution to Problem

To accomplish the object, the present invention provides a temporary adhesive material for substrate processing for temporary adhesion of a substrate to a support on a surface of the substrate opposite to a surface to be processed, the material comprising:

a first temporary adhesive layer; and a second temporary adhesive layer that is distinct from the first temporary adhesive layer, where one or both of the first temporary adhesive layer and the second temporary adhesive layer have (at least one layer has) a minimum shear viscosity of 1 Pa·s or higher and 10,000 Pa·s or lower within the range of 130° C. to 250° C., wherein:

the temporary adhesive material contains 10 parts by mass or more and 100 parts by mass or less of a siloxane bond-containing polymer having a weight-average molecular weight of 3,000 or more and 700,000 or less as measured by GPC based on a total mass of 100 parts.

The inventive temporary adhesive material for substrate processing as described above facilitates temporary adhesion between a substrate and a support, is excellent in dimensional resistance, exhibits high rate of forming a temporary adhesive material layer, has high conformity with a process including TSV formation and a process of back surface wiring of a substrate, has excellent resistance to a thermal process such as CVD, and is easily separated to improve the productivity of thin substrates.

In this case, the first temporary adhesive layer can include a thermoplastic resin.

Such a temporary adhesive material for substrate processing makes it possible to clean the treated substrate easily, so that productivity of thin substrates can be further improved.

Furthermore, in this case, the siloxane bond-containing polymer can have a repeating unit shown by the following general formula (1):

(1)

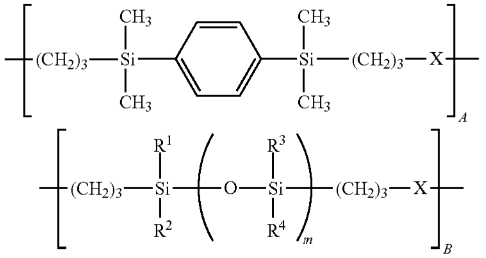

wherein $R^1$ to $R^4$ each independently represent the same or different monovalent hydrocarbon group having 1 to 8 carbon atoms; "m" is an integer of 1 to 100; B is a positive number, A is 0 or a positive number, provided that A+B=1; and X is a divalent organic group shown by the following general formula (2):

(2)

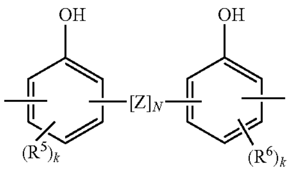

wherein Z represents a divalent organic group selected from any of

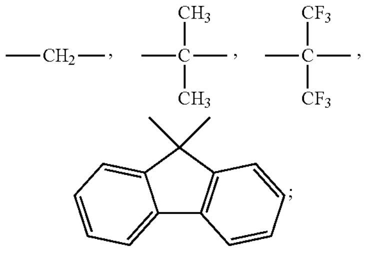

N represents 0 or 1; $R^5$ and $R^6$ each independently represent the same or different alkyl group or alkoxy group having 1 to 4 carbon atoms; and "k" represents any of 0, 1, and 2.

Furthermore, the siloxane bond-containing polymer can also have a repeating unit shown by the following general formula (3):

(3)

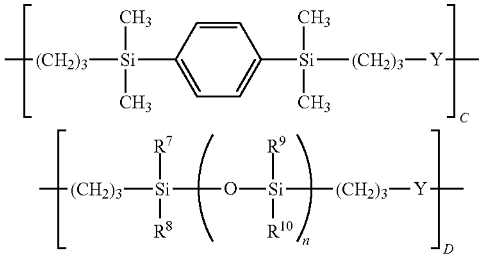

wherein $R^7$ to $R^{10}$ each independently represent the same or different monovalent hydrocarbon group having 1 to 8 carbon atoms; "n" is an integer of 1 to 100; D is a positive number, C is 0 or a positive number, provided that C+D=1; and Y is a divalent organic group shown by the following general formula (4):

(4)

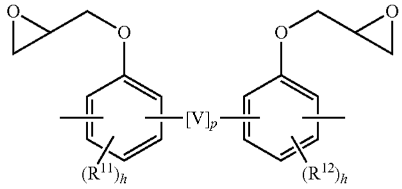

wherein V represents a divalent organic group selected from any of

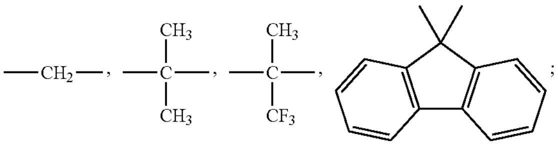

"p" represents 0 or 1; $R^{11}$ and $R^{12}$ each independently represent the same or different alkyl group or alkoxy group having 1 to 4 carbon atoms; and "h" represents any of 0, 1, and 2.

In addition, the siloxane bond-containing polymer can contain:

(p1) an organopolysiloxane having an alkenyl group in a molecule thereof;

(p2) an organohydrogenpolysiloxane having two or more silicon atom-bonded hydrogen atoms (Si—H groups) per molecule, in such an amount that a mole ratio of the Si—H group in the component (p2) to the alkenyl group in the component (p1) ranges from 0.3 to 15; and (p3) a platinum-based catalyst.

The inventive temporary adhesive material for substrate processing as described is even more excellent in heat resistance, and is therefore preferable.

The present invention also provides a method for manufacturing a laminate by bonding a substrate and a support through a temporary adhesive material, the method comprising the following steps (a) to (d):

(a) forming a temporary adhesive layer on a surface to be bonded of one or both of the substrate and the support by using the above-described temporary adhesive material for substrate processing;

(b) heating one or both of the substrate and the support at a temperature of 30° C. or higher and 100° C. or lower in advance;

(c) keeping the substrate and the support in contact with each other through the temporary adhesive material under reduced pressure and applying a pressure of 1 MPa or lower; and (d) heating the substrate at a temperature of 130° C. or higher and 250° C. or lower while maintaining the pressure.

According to such a method for manufacturing a laminate, a laminate can be produced without voids when bonding a substrate having an uneven surface to a support via a temporary adhesive material.

Advantageous Effects of Invention

As described above, the inventive temporary adhesive material for substrate processing facilitates temporary adhesion between a substrate and a support, rapidly forms a temporary adhesive material layer on a substrate or a support, has excellent dimensional resistance and excellent resistance to a thermal process such as CVD (chemical vapor deposition), and is easily separated to improve the productivity of laminates. In addition, a thin substrate having a through electrode structure or a bump connection structure can be produced conveniently since separation can be carried out on a surface of the temporary adhesive material layer or within the temporary adhesive material layer when separating the substrate and the support after the temporary adhesion. Furthermore, an adhesive material layer having high film thickness uniformity can be formed even on a stepped substrate, and this film thickness uniformity makes it possible to obtain a uniform laminate (thin substrate, etc.) of 50 μm or less easily. Moreover, after fabricating a laminate, the substrate can be easily separated from the support at room temperature, for example, so that a fragile laminate such as a thin substrate can be easily manufactured.

BRIEF DESCRIPTION OF DRAWINGS

FIG. 1 is a schematic diagram showing an example of a laminate produced by using the inventive temporary adhesive material for substrate processing to bond a substrate and a support.

DESCRIPTION OF EMBODIMENTS

As described above, it has been desired to develop a temporary adhesive material for processing a substrate which facilitates temporary adhesion, rapidly forms a temporary adhesive material layer on a substrate or a support, has excellent dimensional resistance and excellent resistance to a thermal process of a substrate such as CVD, and is easily separated to improve the productivity of thin substrates.

To achieve the object, the present inventors have earnestly studied and found out that a thin substrate having a through electrode structure or a bump connection structure can be manufactured easily by using a temporary adhesive material for substrate processing for temporary adhesion of a substrate to a support on a surface of the substrate opposite to a surface to be processed, the material including:

a first temporary adhesive layer; and a second temporary adhesive layer that is distinct from the first temporary adhesive layer, where at least one of the first temporary adhesive layer and the second temporary adhesive layer has a minimum shear viscosity of 1 Pa·s or higher and 10,000 Pa·s or lower, preferably 5 Pa·s or higher and 8,000 Pa·s or lower, within the range of 130° C. to 250° C., where:

the temporary adhesive material contains 10 parts by mass or more and 100 parts by mass or less of a siloxane bond-containing polymer having a weight-average molecular weight of 3,000 or more and 700,000 or less as measured by gel permeation chromatography (GPC) based on a total mass of 100 parts. Thus, the present invention has been completed.

Hereinafter, the present invention will be described in detail, but the present invention is not limited thereto. Note that in the present description, weight-average molecular weight (Mw) and number-average molecular weight (Mn) are determined in terms of polystyrene by gel permeation chromatography (GPC) using a calibration curve with polystyrene as a standard.

[Temporary Adhesive Material for Substrate Processing]

The inventive temporary adhesive material for substrate processing is for temporary adhesion of a substrate to a support on a surface of the substrate opposite to a surface to be processed, and the temporary adhesive material includes: a first temporary adhesive layer; and a second temporary adhesive layer that is distinct from the first temporary adhesive layer. One or both of the first temporary adhesive layer and the second temporary adhesive layer (that is, at least one layer of them) have a minimum shear viscosity of 1 Pa·s or higher and 10,000 Pa·s or lower within the range of 130° C. to 250° C. Herein, the temporary adhesive material contains 10 parts by mass or more and 100 parts by mass or less of a siloxane bond-containing polymer having a weight-average molecular weight of 3,000 or more and 700,000 or less as measured by GPC based on a total mass of the material of 100 parts.

As shown in FIG. 1, the inventive temporary adhesive material for substrate processing includes (A) a first temporary adhesive layer and (B) a second temporary adhesive layer that is distinct from the first temporary adhesive layer, and forms a temporary adhesive layer 2 to be interposed between a substrate 1 and a support 3. The substrate 1 has a back surface to be processed. The support 3 supports the substrate 1 while the substrate 1 is being processed. The temporary adhesive layer 2 has a two-layer structure including the first temporary adhesive layer (A) and the second temporary adhesive layer (B). In FIG. 1, the first temporary adhesive layer is releasably adhered to a surface of the substrate 1, and the second temporary adhesive layer is releasably adhered to a surface of the support 3. However, instead, the first temporary adhesive layer may be releasably adhered to the surface of the support 3, and the second temporary adhesive layer may be releasably adhered to the surface of the substrate 1.

Furthermore, essential conditions for the inventive temporary adhesive material for substrate processing are: that the material contains 10 parts by mass or more and 100 parts by mass or less of the above-described siloxane bond-containing polymer based on a total mass of 100 parts; and that one or both of the first temporary adhesive layer and the second temporary adhesive layer have a minimum shear viscosity within the above-described range. Such a temporary adhesive material for substrate processing of the present invention allows appropriate adhesive strength between the substrate and the temporary adhesive layer, between the support and the temporary adhesive layer, and between the first temporary adhesive layer and the second temporary adhesive layer. Therefore, separation is possible on the surface of the temporary adhesive layer or within the temporary adhesive layer when separating the substrate and the support after the temporary adhesion. Here, the surface of the temporary adhesive layer refers to the surface of the temporary adhesive layer that is releasably adhered to the substrate or the support (the adhesion face between the substrate or the support and the temporary adhesive layer). "Within the temporary adhesive layer" can be inside the temporary adhesive layer, and is not particularly limited, but can be, for example, the adhesion face between the first temporary adhesive layer and the second temporary adhesive layer. Note that the shear viscosity in the present invention was determined by measuring the viscosity at 130° C. to 250° C. according to the method described in JIS K 7244. The minimum shear viscosity of each layer is the smallest shear viscosity within the above temperature range.

Shear viscosity can be measured using HAAKE MARS manufactured by Thermo Fisher Scientific K.K. For example, the temperature is raised from room temperature to 250° C. at 10° C./minute, shear viscosity is measured within the range of 130° C. to 250° C. during this period, and the lowest shear viscosity (minimum shear viscosity) within the temperature range is determined. Note that the measurement can be performed at a wave number of 1 Hz and a gap of 500 μm.

[Laminate]

As shown in FIG. 1, the laminate of the present invention includes a substrate 1 to be processed on the back surface, a support 3 for supporting the substrate 1 during processing of the substrate 1, and a temporary adhesive layer 2 interposed between the substrate 1 and the support 3. As described above, the temporary adhesive layer 2 has a two-layer structure of a first temporary adhesive layer (A) and a second temporary adhesive layer (B), and either layer may be on the side of the substrate.

[Temporary Adhesive Layer]

The temporary adhesive layer has a two-layer structure including a first temporary adhesive layer and a second temporary adhesive layer that is distinct from the first temporary adhesive layer. The temporary adhesive layer contains 10 parts by mass or more and 100 parts by mass or less of the above siloxane bond-containing polymer based on a total mass of 100 parts of the temporary adhesive layer. In addition, at least one layer out of the first temporary adhesive layer and the second temporary adhesive layer has a minimum shear viscosity of 1 Pa·s or higher and 10,000 Pa·s or lower within the range of 130° C. to 250° C. When the shear viscosity is within this range, a stepped substrate can be favorably filled with the temporary adhesive material. The temporary adhesive layer is not particularly limited as long as the above-described conditions are satisfied.

If the siloxane bond-containing polymer is contained in an amount of less than 10 parts by mass based on a total mass of 100 parts of the temporary adhesive material, it is not possible to achieve a temporary adhesive material for substrate processing that facilitates temporary adhesion and removal, can quickly form a temporary adhesive layer on a substrate or a support, and has excellent dimensional resistance and resistance to thermal processes.

Meanwhile, if the first temporary adhesive layer and the second temporary adhesive layer are not distinct, release property is poor, and if both the first temporary adhesive layer and the second temporary adhesive layer have a minimum shear viscosity of less than 1 Pa·s or more than 10,000 Pa·s within the range of 130° C. to 250° C., adhesive property is poor.

The material (resin) constituting each layer can be a material that satisfies the above conditions, and can be constituted from a thermoplastic resin or a thermosetting resin. Hereinafter, the materials constituting each layer will be described.

<Thermoplastic Resin>

Out of the temporary adhesive layer, the first temporary adhesive layer (A) can be constituted from a thermoplastic resin. As a material for forming the first temporary adhesive layer (A), thermoplastic resins with good filling property are preferably used in view of applicability to a stepped substrate or the like. Particularly, thermoplastic resins having a glass transition temperature of about −80 to 150° C. without containing organopolysiloxane are preferable, including olefinic thermoplastic elastomer, polybutadiene type thermoplastic elastomer, styrenic thermoplastic elastomer, styrene-butadiene type thermoplastic elastomer, and styrene-polyolefin type thermoplastic elastomer. A particularly preferable one is hydrogenated polystyrene type elastomer, which is excellent in heat resistance.

As the thermoplastic resin, commercially available articles can be used, including Tuftec (Asahi Kasei Corporation), ESPOLEX SB series (Sumitomo Chemical Corporation), RABALON (Mitsubishi Chemical Corporation), SEPTON (KURARAY CO., LTD.), and DYNARON (JSR Corporation), together with cycloolefin polymers represented by ZEONEX (ZEON CORPORATION) and cycloolefin copolymers represented by TOPAS (Polyplastics Co., Ltd.).

As described above, thermoplastic elastomer is preferable as a thermoplastic resin of the first temporary adhesive layer (A). It is also possible to use the resins in combination of two or more kinds.

The above resin facilitates handling of a breakable thin substrate since the temporary adhesive material can be removed or washed from the substrate more easily after manufacturing the laminate (thin substrate, etc.).

The above thermoplastic resin (composition) can be used for forming the temporary adhesive material layer after being dissolved in a solvent to obtain a temporary adhesive material solution. Illustrative examples of the solvent include hydrocarbons, preferably nonane, p-menthane, pinene, isooctane, and mesitylene, in which nonane, p-menthane, isooctane, and mesitylene are more preferable in view of their coating properties. The solution can be subjected to filtration as necessary. Subsequently, the solution is applied onto the support (release backing), for example, preferably by using a forward roll coater, a reverse roll coater, a comma coater, a die coater, a lip coater, a gravure coater, a dip coater, an air knife coater, a capillary coater, a raising & rising (R&R) coater, a blade coater, a bar coater, an applicator, an extruder, or the like. Then, the support coated with the temporary adhesive material solution is subjected to in-line solvent removal to form the temporary adhesive layer.

Although the thickness of the formed film is not particularly limited, the resin film (the temporary adhesive layer) is desirably formed on the support, and is preferably formed in a film thickness of 0.5 to 80 μm, more preferably 0.5 to 50 μm. To this thermoplastic resin, it is also possible to add antioxidant to improve the heat resistance or surfactant to improve the coating property. As a specific example of the antioxidant, di-t-butylphenol and so on are preferably used. As an example of the surfactant, fluorosilicone type surfactant X-70-1102 (available from Shin-Etsu Chemical Co., Ltd.), etc. are preferably used. Note that although an example in which the first temporary adhesive layer is formed on the support is described above, the first temporary layer can also be formed on the surface of the substrate opposite to the surface to be processed, and can be formed on the second temporary adhesive layer. In addition, the first temporary adhesive layer and the second temporary adhesive layer may be laminated in reverse order.

<Thermosetting Resin>

The temporary adhesive layer (the first temporary adhesive layer and the second temporary adhesive layer) can be constituted from a thermosetting resin. As the thermosetting resin, a thermosetting resin mainly containing a siloxane bond-containing polymer is preferable. In the present invention, the temporary adhesive layer contains 10 parts by mass or more and 100 parts by mass or less of a siloxane bond-containing polymer having a weight-average molecular weight of 3,000 or more and 700,000 or less as measured by GPC based on a total mass of 100 parts. The siloxane bond-containing polymer is not particularly limited, and it is possible to use a polymer including a thermosetting composition mainly containing a thermosetting siloxane-modified polymer shown by the following general formula (1) and/or (3) or a polymer including a thermosetting composition mainly containing an addition-curable siloxane polymer.

For the temporary adhesive layer, it is possible to use both of the polymer shown by the following general formula (1) and the polymer shown by the following general formula (3). In that case, the ratio (mass ratio) thereof is preferably (1):(3)=0.1:99.9 to 99.9:0.1, more preferably (1):(3)=1:99 to 99:1.

Polymer of General Formula (1) (Phenolic Siloxane Polymer):

The polymer having a repeating unit shown by the following general formula (1) is a siloxane bond-containing polymer, and preferably has a weight-average molecular weight of 3,000 to 500,000, more preferably 10,000 to 100,000 in terms of polystyrene determined by gel permeation chromatography (GPC).

(1)

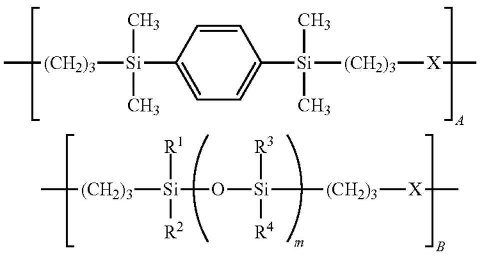

In the formula, $R^1$ to $R^4$ may be identical or different, and represent a monovalent hydrocarbon group having 1 to 8 carbon atoms. "m" is an integer of 1 to 100; B is a positive number; and A is 0 or a positive number. X is a divalent organic group shown by the following general formula (2). A+B=1, "A" is preferably 0 to 0.9, "B" is preferably 0.1 to 1, and when "A" is larger than 0, "A" is preferably 0.1 to 0.7 and "B" is preferably 0.3 to 0.9.

(2)

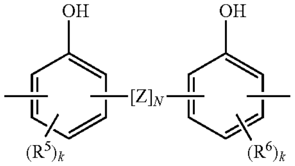

In the formula, Z represents a divalent organic group selected from any of

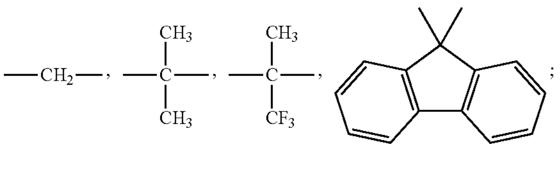

and N represents 0 or 1. $R^5$ and $R^6$ each represent an alkyl group or alkoxy group having 1 to 4 carbon atoms, and may be identical to or different from each other. "k" represents any of 0, 1, and 2.

In this case, illustrative examples of $R^1$ to $R^4$ include a methyl group, an ethyl group, a phenyl group, etc., "m" represents an integer of 1 to 100, preferably 3 to 60, more preferably 8 to 40. B/A is larger than 0 and smaller than 20, particularly from 0.5 to 5.

Polymer of General Formula (3) (Epoxy-Modified Siloxane Polymer):

The polymer having a repeating unit shown by the following general formula (3) is a siloxane bond-containing polymer, and has a weight-average molecular weight of 3,000 to 500,000 in terms of polystyrene determined by GPC.

(3)

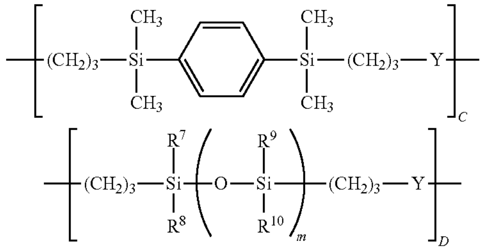

In the formula, $R^7$ to $R^{10}$ may be identical or different, and represent a monovalent hydrocarbon group having 1 to 8 carbon atoms. "n" is an integer of 1 to 100; D is a positive number; and C is 0 or a positive number. Y is a divalent organic group shown by the following general formula (4). C+D=1, C is preferably 0 to 0.9 and D is preferably 0.1 to 1. When C is larger than 0, C is preferably 0.1 to 0.7 and D is preferably 0.3 to 0.9.

(4)

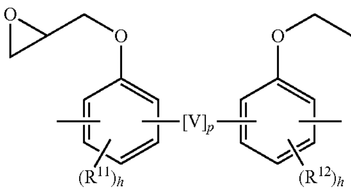

In the formula, V represents a divalent organic group selected from any of

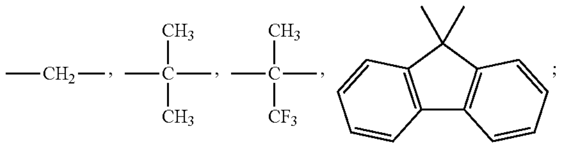

and "p" represents 0 or 1. $R^{11}$ and $R^{12}$ each represent an alkyl group or alkoxy group having 1 to 4 carbon atoms, and may be identical to or different from each other. "h" represents any of 0, 1, and 2.

In this case, illustrative examples of $R^7$ to $R^{10}$ include the same examples as those illustrated in $R^1$ to $R^4$ in the above general formula (1). "n" represents an integer of 1 to 100, preferably 3 to 60, more preferably 8 to 40. D/C is larger than 0 and smaller than 20, particularly from 0.5 to 5.

The thermosetting composition mainly containing the thermosetting siloxane-modified polymer of the general formulae (1) and/or (3) may contain one or more cross-linkers for heat curing. In the case of the phenolic siloxane polymer of the general formula (1), the crosslinker is selected from an amino condensate, a melamine resin, a urea resin each modified with formalin or formalin-alcohol, a phenol compound having on average two or more methylol or alkoxymethylol groups (alkoxymethyl groups) per molecule, and an epoxy compound having on average two or more epoxy groups per molecule.

Here, the amino condensate, the melamine resin, and the urea resin each modified with formalin or formalin-alcohol may be exemplified by the following. For example, the melamine resin (condensate) modified with formalin or formalin-alcohol can be a partial condensate of alkoxymethylol melamine such as hexamethoxymethylol melamine, and can be obtained by addition condensation polymerization of a modified melamine monomer (e.g. trimethoxymethyl monomethylol melamine), or a polymer thereof (e.g. oligomer such as dimer and trimer) with formaldehyde until a desired molecular weight is achieved, according to a known method. One of these compounds may be used or two or more kinds may be used in combination.

The urea resin (condensate) modified with formalin or formalin-alcohol can be prepared, for example, by modifying a urea condensate having a desired molecular weight with formalin into a methylol form, and optionally, further modifying the resultant compound with an alcohol into an alkoxy form, according to a known method. Illustrative examples of the urea resin modified with formalin or formalin-alcohol include methoxymethylated urea condensate, ethoxymethylated urea condensate, propoxymethylated urea condensate, and the like. One of these compounds may be used or two or more kinds may be used in combination.

Illustrative examples of the phenol compound having on average two or more methylol or alkoxymethylol groups (alkoxymethyl groups) per molecule include (2-hydroxy-5-methyl)-1,3-benzenedimethanol, 2,2',6,6'-tetramethoxymethylbisphenol A, and the like. One of these phenol compounds may be used or a combination of two or more kinds may be used.

On the other hand, in the case of the epoxy-modified siloxane polymer of the general formula (3), the composition may contain one or more crosslinkers selected from an epoxy compound having on average two or more epoxy groups per molecule and a phenol compound having on average two or more phenol groups per molecule.

Here, the epoxy compound having a polyfunctional epoxy group used in the general formula (1) is not particularly limited. A bi-functional, a tri-functional, or a tetra-functional or more of the polyfunctional epoxy resins, for example, EOCN-1020, EOCN-102S, XD-1000, NC-2000-L, EPPN-201, GAN, and NC6000 all available from Nippon Kayaku Co., Ltd., or a crosslinker shown by any of the following formulae may be contained.

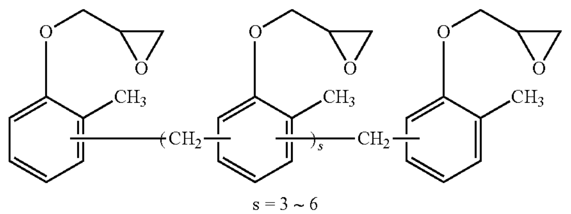

s = 3 ~ 6

EOCON-1020

-continued

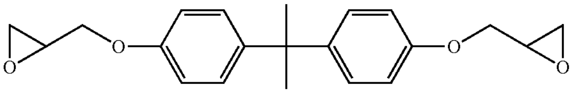

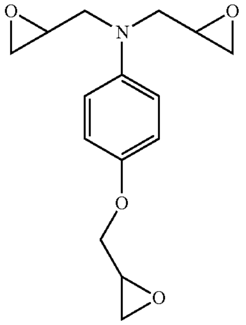

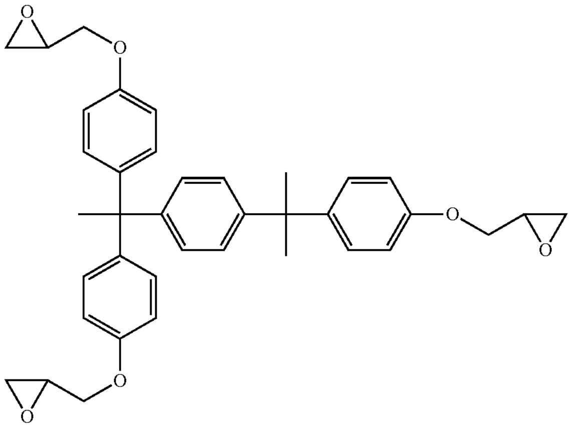

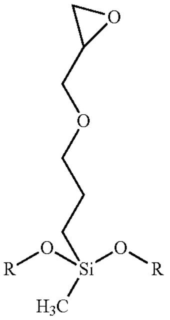

R = a methyl group or an ethyl group

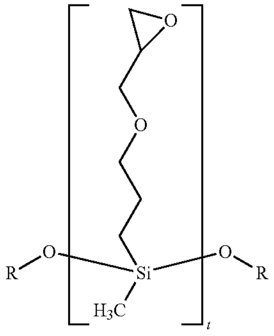

R = a methyl group or an ethyl group t = 1 20 mass % t = 2 75 mass % t ≥ 3 5 mass %

In the case that the thermosetting polymer is the epoxy-modified siloxane polymer of the above general formula (3), specific examples of the phenol compound having on average two or more phenol groups per molecule as the cross-linker include m- or p-cresol-novolac resins such as EP-6030G available from Asahi Organic Chemicals Industry Co., Ltd., tri-functional phenol compounds such as Tris-P-PA available from Honshu Chemical Industry Co., Ltd., tetra-functional phenol compounds such as TEP-TPA available from Asahi Organic Chemicals Industry Co., Ltd., etc.

The formulation amount of the crosslinker can be 0.1 to 50 parts by mass, preferably 0.1 to 30 parts by mass, more preferably 1 to 20 parts by mass based on 100 parts by mass of the thermosetting polymer of the above general formulae (1) and/or (3). Two, three or more crosslinkers may be blended in combination.

A curing catalyst such as an acid anhydride may be contained in an amount of 10 parts by mass or less based on 100 parts by mass of the thermosetting polymer.

The thermosetting resin (composition) can be dissolved in a solvent and used for forming the temporary adhesive material layer as the temporary adhesive material layer solution. Illustrative examples of the solvent include ketones such as cyclohexanone, cyclopentanone, and methyl-2-n-amyl ketone; alcohols such as 3-methoxybutanol, 3-methyl-3-methoxybutanol, 1-methoxy-2-propanol, and 1-ethoxy-2-propanol; ethers such as propylene glycol monomethyl ether, ethylene glycol monomethyl ether, propylene glycol monoethyl ether, ethylene glycol monoethyl ether, propylene glycol dimethyl ether, and diethylene glycol dimethyl ether; esters such as propylene glycol monomethyl ether acetate, propylene glycol monoethyl ether acetate, ethyl lactate, ethyl pyruvate, butyl acetate, methyl 3-methoxypropionate, ethyl 3-ethoxy propionate, tert-butyl acetate, tert-butyl propionate, propylene glycol mono-tert-butyl ether acetate, and γ-butyrolactone. One of these solvents may be used or a combination of two or more kinds may be used. Furthermore, the solution can be subjected to filtration as necessary.

In addition, a known antioxidant and a filler such as silica may be added in an amount of 50 parts by mass or less based on 100 parts by mass of the thermosetting polymer to improve heat resistance further. Moreover, a surfactant may be added to improve coating uniformity. In addition, a release improver may be added to improve release property.

Illustrative examples of the antioxidant that can be added into the temporary adhesive layer include hindered phenol compounds such as tetrakis[methylene-(3,5-di-tert-butyl-4-hydroxyhydrocinnamate)]methane (product name: Adekastab AO-60).

In this event, the film to be formed preferably has a film thickness of 5 to 150 μm, more preferably 10 to 120 μm, although the film thickness is not particularly limited. When the film thickness is 5 μm or more, the film can sufficiently withstand the grinding step for thinning the substrate. When the film thickness is 150 μm or less, the resin is prevented from deforming in the heat treatment process such as TSV formation process, and can be put to practical use.

Addition-Curable Siloxane Polymer:

Furthermore, the temporary adhesive layer can be an addition-curable siloxane polymer containing the following components (p1), (p2), and (p3).

(p1) An organopolysiloxane having an alkenyl group(s) in the molecule: 100 parts by mass;

(p2) an organohydrogenpolysiloxane having two or more silicon atom-bonded hydrogen atoms (Si—H groups) per molecule: an amount such that a mole ratio of the Si—H group in the component (p2) to the alkenyl group in the component (p1) ranges from 0.3 to 15;

(p3) a platinum-based catalyst: more than 0 parts by mass and 0.5 parts by mass or less as the effective component (in terms of mass).

Hereinafter, each component will be described.

[Component (p1)]

The component (p1) is an organopolysiloxane having an alkenyl group(s) in the molecule. The component (p1) is preferably a linear or branched organopolysiloxane containing 0.3 to 10 mol % of alkenyl groups based on the molar amount of the Si in one molecule (mole of alkenyl group/mole of Si). The organopolysiloxane particularly preferably contains 0.6 to 9 mol % of alkenyl groups based on the molar amount of the Si.

Illustrative examples of such organopolysiloxane include compounds shown by the following formula (5) and/or (6).

$$R^{13}_{(3-a)}X^{1}_{a}SiO—(R^{13}X^{1}SiO)_{1}—(R^{13}_{2}SiO)_{r}—SiR^{13}_{(3-a)}X^{1}_{a} \quad (5)$$

$$R^{13}_{2}(HO)SiO—(R^{13}X^{1}SiO)_{1+2}-(R^{13}_{2}SiO)_{r}—SiR^{13}_{2}(OH) \quad (6)$$

In the formulae, each Rn independently represents a monovalent hydrocarbon group having no aliphatic unsaturated bond; each $X^1$ independently represents a monovalent organic group containing an alkenyl group; and "a" is an integer of 0 to 3. In the formula (5), 2a+1 is such a number that the content of alkenyl group is 0.3 to 10 mol % per molecule. In the formula (6), 1+2 is such a number that the content of alkenyl group is 0.3 to 10 mol % per molecule. "1" is 0 or a positive number of 500 or less, and "r" is a positive number of 1 to 10,000.

In the above formulae, Rn is preferably a monovalent hydrocarbon group having 1 to 10 carbon atoms and no aliphatic unsaturated bond. Examples thereof include alkyl groups such as a methyl group, an ethyl group, a propyl group, and a butyl group; cycloalkyl groups such as a cyclohexyl group; and aryl groups such as a phenyl group and a tolyl group. In particular, alkyl groups such as a methyl group and a phenyl group are preferable.

$X^1$, a monovalent organic group having an alkenyl group, is preferably an organic group having 2 to 10 carbon atoms. Examples thereof include alkenyl groups such as a vinyl group, an allyl group, a hexenyl group, and an octenyl group; (meth)acryloylalkyl groups such as an acryloylpropyl group, an acryloylmethyl group, and a methacryloylpropyl group; (meth)acryloxyalkyl groups such as an acryloxypropyl group, an acryloxymethyl group, a methacryloxypropyl group, and a methacryloxymethyl group; and alkenyl group-containing monovalent hydrocarbon groups such as a cyclohexenylethyl group and a vinyloxypropyl group. In particular, a vinyl group is industrially preferable.

In the general formula (5), "a" is an integer of 0 to 3, preferably 1 to 3 because it allows terminals of the molecular chain to be blocked with alkenyl groups to complete the reaction within a short time by the alkenyl groups with good reactivity at the terminal of the molecular chain, and further preferably a=1 industrially in view of the cost. This alkenyl group-containing organopolysiloxane is preferably in an oil state or a crude rubber state. The alkenyl group-containing organopolysiloxane may be linear or branched. The component (p1) may be used in combination of two or more kinds.

It is to be noted that the component (p1) preferably has a number-average molecular weight (Mn) of 100000 to 500000 determined by GPC.

[Component (p2)]

The component (p2) is a crosslinker and an organohydrogenpolysiloxane having two or more silicon-bonded hydrogen atoms (Si—H groups) per one molecule. The component (p2) has at least 2, preferably 2 or more and 100 or fewer, more preferably 3 or more and 50 or fewer silicon-bonded hydrogen atoms (SiH groups) per one molecule; and may be linear, branched, or cyclic.

The viscosity at 25° C. of the organohydrogen-polysiloxane of the component (p2) is preferably 1 to 5,000 mPa·s, more preferably 5 to 500 mPa·s. The organohydrogenpolysiloxane may be a mixture of two or more kinds. It is to be noted that the viscosity is measured with a rotational viscometer.

The component (p2) is preferably blended such that the mole ratio of the Si—H group in the component (p2) to the alkenyl group in the component (p1) (Si—H group/alkenyl group) is in a range of 0.3 to 15, preferably 0.3 to 10, particularly preferably 1 to 8. The mole ratio of 0.3 or more between the SiH group and the alkenyl group is preferable because it prevents risks of lowering the crosslinking density and causing an issue of inability to cure the adhesive layer. The mole ratio of 15 or less prevents excess increase of the crosslinking density and gives sufficient adhesion and tackiness.

[Component (p3)]

The component (p3) is a platinum-based catalyst (i.e., platinum group metal catalyst). Examples thereof include chloroplatinic acid, a solution of chloroplatinic acid in alcohol, a reaction product of chloroplatinic acid with alcohol, a reaction product of chloroplatinic acid with an olefin compound, and a reaction product of chloroplatinic acid with a vinyl group-containing siloxane.

The component (p3) is added in an effective amount, which is generally 1 to 5,000 ppm, preferably 5 to 2,000 ppm, in terms of the mass of platinum with respect to the total of (p1) and (p2). The amount of 1 ppm or more prevents the composition from lowering the curability, lowering the crosslinking density, and lowering the holding force. The amount of 5,000 ppm or less makes it possible to prolong the available time of the treatment solution.

The thermosetting siloxane polymer layer composition can be dissolved in a solvent and used for forming the temporary adhesive material layer as a temporary adhesive layer solution. Illustrative examples of the solvent suitably used include hydrocarbon solvents such as pentane, hexane, cyclohexane, isooctane, nonane, decane, p-menthane, pinene, isododecane, and limonene; and volatile and low-molecular weight siloxanes such as hexamethyldisiloxane and octamethyltrisiloxane. One of these solvents may be used or a combination of two or more kinds thereof may be used. To this composition for a thermosetting siloxane polymer layer, a known antioxidant can be added to improve the heat resistance. Furthermore, the solution may be filtered in accordance with needs.

In this case, the film to be formed preferably has a film thickness of 0.1 to 30 μm, particularly 1.0 to 15 μm. With the film thickness of 0.1 μm or more, the separation from a substrate or a support is further facilitated. On the other hand, the film thickness of 30 μm or less makes it possible to sufficiently withstand the grinding step in case of forming a thin wafer. Incidentally, to this thermosetting siloxane polymer layer, it is possible to add a filler such as silica in an amount of 50 parts by mass or less based on 100 parts by mass of the whole mixture of components (p1), (p2), and (p3) of the thermosetting siloxane polymer in order to improve the heat resistance.

[Method for Manufacturing Laminate]

The inventive method for manufacturing a laminate includes the steps (a) to (d).

[Step (a)]

The step (a) is a step of forming a temporary adhesive layer on a surface to be bonded of one or both of the substrate and the support by using the inventive temporary adhesive material for substrate processing.

The substrate to be processed is, for example, a substrate in which one of the surfaces is a circuit-forming surface, and the other surface to be processed (back surface) is a non-circuit-forming surface. The substrate to which the present invention can be applied is normally a semiconductor substrate. As the semiconductor substrate, a disc-shaped wafer and a square substrate can be exemplified. Examples of the wafer include not only a silicon wafer, but also a germanium wafer, a gallium-arsenic wafer, a gallium-phosphorus wafer, and a gallium-arsenic-aluminum wafer. The thickness of the substrate is typically, but not particularly limited to, 600 to 800 μm, more typically 625 to 775 μm.

The inventive method for manufacturing a laminate (a thin wafer, etc.) is particularly useful for a substrate having a step due to the circuit on the surface, particularly for a substrate having a step of 10 to 80 μm, preferably 20 to 70 μm.

As the support, a substrate such as a silicon wafer, a glass plate, and a quartz wafer can be used without any limitation. In the present invention, it is not necessary to irradiate the temporary adhesive material layer with an energy beam through the support, so that the support does not have to be light transmittable.

Each of the first temporary adhesive layer and the second temporary adhesive layer may be formed on the substrate (wafer) or the support as a film, or a solution of each layer may be applied on the wafer or the support by a method such as spin-coating and roll-coating to form the layer. In this case, after the spin-coating, the product is heated in advance at a temperature of 80 to 200° C., preferably 100 to 180° C. depending on the volatilizing conditions of the solvent, and then used. The first temporary adhesive layer and the second temporary adhesive layer may both be formed on the substrate or the support, or alternatively, only one may be formed on the substrate or the support. An example of a method for forming a temporary adhesive layer is given below.

[Formation Method 1]

A first temporary adhesive layer is formed on a support by using a solution for a first temporary adhesive layer, and then a second temporary adhesive layer is formed on the formed first temporary adhesive layer by using a solution for a second temporary adhesive layer.

[Formation Method 2]

A first temporary adhesive layer is formed on a support by using a solution for a first temporary adhesive layer. Separately, a second temporary adhesive layer is formed on a substrate by using a solution for a second temporary adhesive layer.

Meanwhile, when each adhesive layer is formed with a film, the components of the present invention can be formed on a protective film such as polyethylene and polyester, and the protective film can be delaminated for use.

The steps (b) to (d) are steps of bonding the substrate and the support. Examples of a substrate-bonding apparatus include a commercially available wafer-bonding apparatus such as EVG520IS and 850 TB manufactured by EVG Group, and XBS300 manufactured by SUSS MicroTec AG when a wafer is used.

The substrate and the support can be arranged in the apparatus in such a manner that the substrate and the support can be bonded through a temporary adhesive material. For example, when the first temporary adhesive layer and the second temporary adhesive layer are formed on the support as in the formation method 1, the substrate and the support can be arranged in the apparatus so that the surface of the substrate on which the temporary adhesive layer is to be formed faces the surface of the support on which the temporary adhesive layer is formed. Alternatively, when the first temporary adhesive layer or the second temporary adhesive layer are respectively formed on the substrate or the support as in the formation method 2, the substrate and the support can be arranged in the apparatus so that the surface of the substrate on which the temporary adhesive layer is formed faces the surface of the support on which the temporary adhesive layer is formed.

[Step (b)]

The step (b) is a step of heating one or both of the substrate and the support in advance.

In this case, the heating means is incorporated in the bonding apparatus, and a heater is incorporated in a plate (chamber) where the substrate and the support are placed. Incidentally, the heater can be a known heating device. One or both of the substrate and the support are heated at a temperature of 30° C. or higher and 100° C. or lower.

[Step (c)]

The step (c) is a step of keeping the substrate and the support in contact with each other through the temporary adhesive material under reduced pressure and applying a pressure of 1 MPa or lower. For example, under the temperature conditions of heating in step (b) and under vacuum (under reduced pressure; at a pressure of 1 Pa or lower), the substrate is pressed uniformly at a pressure of 1 MPa or lower. In this event, the time for pressing is 10 seconds to 10 minutes, preferably 30 seconds to 5 minutes.

[Step (d)]

The step (d) is a step of heating the substrate at a temperature of 130° C. or higher and 250° C. or lower while maintaining the pressure in the step (c). The time for maintaining the pressure in this event is 10 seconds to 10 minutes, preferably 30 seconds to 5 minutes.

In a laminate that can be obtained by using the inventive temporary adhesive material through the steps (a) to (d), at least one layer out of the first temporary adhesive layer and the second temporary adhesive layer has a minimum shear viscosity of 1 Pa·s or higher and 10,000 Pa·s or lower within the range of 130° C. to 250° C. Therefore, a stepped substrate can be favorably filled with a temporary adhesive material.

Example

Hereinafter, the present invention will be more specifically described by showing Examples and Comparative Examples, but the present invention is not limited to these Examples. In the following examples, part means part by mass, Me represents a methyl group, and Vi represents a vinyl group. The compounds (M-1) to (M-5) used in the following resin solution preparation examples are shown below.

(M-1)

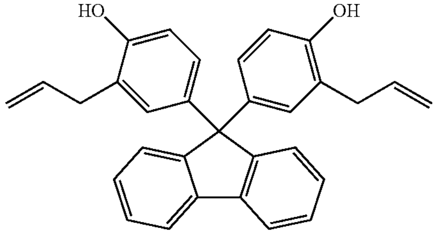

(M-2)

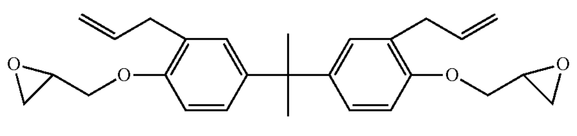

-continued (M-3)

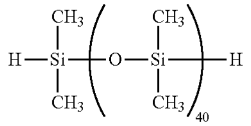

(M-4)

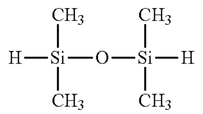

(M-5)

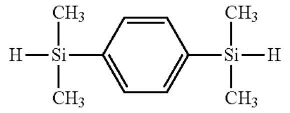

Resin Solution Preparation Example 1

As a hydrogenated styrene-isoprene-butadiene copolymer, 24 g of thermoplastic resin SEPTON 4033 (styrene content: 30%, KURARAY CO., LTD.) was dissolved into 176 g of isononane to give 12 mass % of an isononane solution of a hydrogenated styrene-isoprene-butadiene copolymer. The obtained solution was filtrated through a 0.2-μm membrane filter to give an isononane solution of thermoplastic resin (A-1).

Resin Solution Preparation Example 2

As a hydrogenated styrene-isoprene-butadiene copolymer, 30 g of thermoplastic resin SEPTON 4044 (styrene content: 32%, KURARAY CO., LTD.) was dissolved into 176 g of isononane to give 12 mass % of an isononane solution of a hydrogenated styrene-isoprene-butadiene copolymer. The obtained solution was filtrated through a 0.2-μm membrane filter to give an isononane solution of thermoplastic resin (A-2).

Resin Solution Preparation Example 3

In a flask equipped with a stirrer, a thermometer, a nitrogen purge system, and a reflux condenser were put 43.1 g of 9,9'-bis(3-allyl-4-hydroxyphenyl)fluorene (M-1), 29.5 g of organohydrogensiloxane having the average structural formula (M-3), 135 g of toluene, and 0.04 g of chloroplatinic acid, and the mixture was heated at 80° C. Then, 17.5 g of 1,4-bis(dimethylsilyl)benzene (M-5) was added dropwise into the flask over 1 hour. At this time, the temperature inside the flask was increased to 85° C. After completion of dropwise addition, the mixture was aged at 80° C. for 2 hours, toluene was then distilled off, and 80 g of cyclohexanone was added thereto to obtain a resin solution containing cyclohexanone as a solvent with a concentration of the resin solid of 50 mass %. When the molecular weight of the resin in the solution was measured by GPC, the weight-average molecular weight was 45,000 in terms of polystyrene. Then, 50 g of the resin solution was mixed with 7.5 g of an epoxy crosslinker, EOCN-1020 (available from NIPPON KAYAKU Co., Ltd.), as a crosslinker, 0.2 g of BSDM (bis(tert-butylsulfonyl)diazomethane) available from Wako Pure Chemical Industries Ltd., as a curing catalyst, 0.1 g of tetrakis [methylene-(3,5-di-tert-butyl-4-hydroxyhydrocinnamate)]methane (product name: Adekastab AO-60) as an antioxidant, and 0.1 g of KF-54

(available from Shin-Etsu Chemical Co., Ltd.) as a release improver. The solution was then filtered through a 1-μm membrane filter to obtain a resin solution (B-1). The cured film of (B-1) exhibited a modulus of 300 MPa at 25° C. measured by dynamic viscoelasticity measurement.

Resin Solution Preparation Example 4

In a 5 L-flask equipped with a stirrer, a thermometer, a nitrogen purge system, and a reflux condenser, 84.1 g of epoxy compound (M-2) was dissolved in 600 g of toluene, subsequently, 294.6 g of compound (M-3), and 25.5 g of compound (M-4) were added, and the mixture was heated at 60° C. Thereafter, 1 g of carbon carried platinum catalyst (5 mass %) was added thereto, and after confirming that the internal reaction temperature was increased to 65 to 67° C., the mixture was further heated to 90° C. and aged for 3 hours. Then, the mixture was cooled to room temperature, and 600 g of methyl isobutyl ketone (MIBK) was added thereto. This reaction solution was filtered under pressure through a filter to remove the platinum catalyst. The solvent in the resin solution was distilled off under reduced pressure, and 270 g of propylene glycol monomethyl ether acetate (PGMEA) was added thereto to obtain a resin solution containing PGMEA as a solvent with a concentration of the solid component of 60 mass %. When the molecular weight of the resin in the resin solution was measured by GPC, the weight-average molecular weight was 28,000 in terms of polystyrene. Then, 100 g of the resin solution was mixed with 9 g of a tetra-functional phenol compound, TEP-TPA (available from Asahi Organic Chemicals Industry Co., Ltd.), 0.2 g of tetrahydrophthalic anhydride (available from New Japan Chemical Co., Ltd., RIKACID HH-A), and 0.1 g of KF-54 (available from Shin-Etsu Chemical Co., Ltd.) as a release improver. The solution was then filtered through a 1-μm membrane filter to obtain a resin solution (B-2). The cured film of (B-2) exhibited a modulus of 500 MPa at 25° C. measured by dynamic viscoelasticity measurement.

Resin Solution Preparation Example 5

To a solution consisting of 100 parts of polydimethylsiloxane having 3 mol % of vinyl groups on both terminals and the side chain with the molecular terminals being terminated with $SiMe_2Vi$ groups and having a number-average molecular weight (Mn) of 50,000 determined by GPC as well as 400 parts of isododecane, 5 parts of organohydrogenpolysiloxane (2 mol per alkenyl group) shown by the following formula (M-6) was added and mixed. Further, a platinum catalyst CAT-PL-5 (available from Shin-Etsu Chemical Co., Ltd.) was added in an amount of 0.05 parts based on 100 parts of the polydimethylsiloxane. This was filtrated through a 0.2-μm membrane filter to give a thermosetting siloxane polymer solution (C-1).

(M-6)

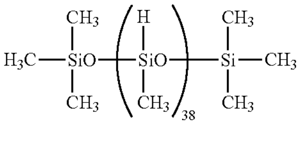

Resin Solution Preparation Example 6

To a solution consisting of 100 parts of polydimethylsiloxane having 3 mol % of vinyl groups on both terminals and the side chain with the molecular terminals being terminated with $SiMe_2Vi$ groups and having a number-average molecular weight (Mn) of 50,000 determined by GPC as well as 400 parts of isododecane, 10 parts of organohydrogenpolysiloxane (2 mol per alkenyl group) shown by the following formula (M-7) was added and mixed. Further, a platinum catalyst CAT-PL-5 (available from Shin-Etsu Chemical Co., Ltd.) was added in an amount of 0.05 parts based on 100 parts of the polydimethylsiloxane. This was filtrated through a 0.2-μm membrane filter to give a thermosetting siloxane polymer solution (C-2).

(M-7)

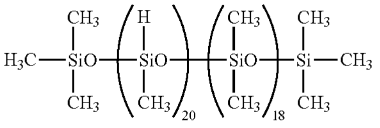

Example 1

A glass wafer with a diameter of 200 mm was spin-coated with the solution (C-1), and then heated on a hot plate to form a film of the material, corresponding to a layer (C). Subsequently, the layer (C) of the glass wafer having the formed layer (C) was spin-coated with the solution (B-1), and then heated on a hot plate to form a film of the material corresponding to a layer (B) (step (a)). The film formation order, heating conditions, and film thickness are shown in Table 1.

Note that the "siloxane bond-containing polymer content" in Table 1 is the parts by mass of the siloxane bond-containing polymer having a weight-average molecular weight of 3,000 or more and 700,000 or less as measured by GPC based on a total mass of 100 parts of the temporary adhesive material.

A silicon wafer with a diameter of 200 mm and a thickness of 725 μm has the entire surface covered with copper posts having a height of 40 μm and a diameter of 40 μm. The silicon wafer and the glass wafer fabricated in the step (a) were placed in a bonding apparatus so that the copper-post surface of the silicon wafer faced the surface of the glass wafer on which the temporary adhesive layer was formed, and heated in advance at 70° C. therein (step (b)). Subsequently, the silicon wafer touched the glass wafer under reduced pressure in the bonding apparatus, and a pressure of 0.5 MPa was applied (step (c)). Furthermore, the substrate was heated to a temperature of 150° C. while maintaining the pressure, and after reaching 150° C., the pressure was further applied for 3 minutes (step (d)) to fabricate a laminate. The conditions of (b) to (d) are shown in Table 3.

Examples 2 to 4 and Comparative Example 1

Under the conditions shown in Tables 1 and 3, Examples 2 to 4 and Comparative Example 1 were carried out in the same manner as Example 1.

—Viscosity Measurement—

Under the conditions of Example 1, a silicon wafer with a diameter of 200 mm was spin-coated with the solution (C-1), and then heated on a hot plate to form a film of the material corresponding to the layer (C). Meanwhile, a silicon wafer with a diameter of 200 mm was spin-coated with the solution (B-1), and then heated on a hot plate to form a film of the material corresponding to the layer (B). Subsequently, the temporary adhesive layers were separated from the silicon wafers to obtain two temporary adhesive films. The viscosity (shear viscosity) of each film was measured by the method described in JIS K 7244 within the range of 130° C. to 250° C. The lower of the minimum viscosities of the two temporary adhesive films is shown in Table 1. The same measurement was conducted for Examples 2 to 4 and Comparative Example 1 in the same manner as in Example 1, and the results are shown in Table 1.

The shear viscosity was measured using HAAKE MARS manufactured by Thermo Fisher Scientific K.K. The temperature was raised from room temperature to 250° C. at 10° C./minute, viscosity was measured within the range of 130° C. to 250° C. during this period, and the lowest viscosity (minimum shear viscosity) within the temperature range has been given in Table 1. Note that the measurement was performed at a wave number of 1 Hz and a gap of 500 μm.

Example 5

A glass wafer with a diameter of 200 mm was spin-coated with the solution (C-2), and then heated on a hot plate to form a film of the material corresponding to the layer (C). Meanwhile, the copper-post surface of a silicon wafer which has a diameter of 200 mm and a thickness of 725 μm and the entire surface of which was covered with copper posts having a height of 40 μm and a diameter of 40 μm was spin-coated with the solution (B-1), and then heated on a hot plate to form a film of the material corresponding to the layer (B) (step (a)). The heating conditions and film thickness are shown in Table 2.

The silicon wafer with the diameter of 200 mm and the thickness of 725 μm the entire surface of which was covered with copper posts having a height of 40 μm and a diameter of 40 μm and the glass wafer fabricated in the step (a) were placed in a bonding apparatus so that the surface of the silicon wafer having the temporary adhesive layer formed faced the surface of the glass wafer having the temporary adhesive layer formed, and heated in advance at 70° C. (step (b)). Subsequently, the silicon wafer touched the glass wafer under reduced pressure in the bonding apparatus, and a pressure of 0.5 MPa was applied (step (c)). Furthermore, the substrate was heated to a temperature of 140° C. while maintaining the pressure, and after reaching 140° C., the pressure was further applied for 3 minutes (step (d)) to fabricate a laminate. The conditions of (b) to (d) are shown in Table 3.

Examples 6 and 7 and Comparative Example 2

Under the conditions shown in Tables 2 and 3, Examples 6 and 7 and Comparative Example 2 were carried out in the same manner as Example 5.

—Viscosity Measurement—

Under the conditions of Example 5, a silicon wafer with a diameter of 200 mm was spin-coated with the solution (C-2), and then heated on a hot plate to form a film of the material corresponding to the layer (C). Meanwhile, a silicon wafer with a diameter of 200 mm was spin-coated with the solution (B-1), and then heated on a hot plate to form a film of the material corresponding to the layer (B). Subsequently, the temporary adhesive layers were separated from the silicon wafers to obtain two temporary adhesive films. The viscosity of each film was measured in the same manner as above by the method described in JIS K 7244 within the range of 130° C. to 250° C. The lower of the minimum viscosities of the two temporary adhesive films is shown in Table 2. The same measurement was conducted for Examples 6 and 7 and Comparative Examples 2 and 3 in the same manner as in Example 5, and the results are shown in Table 2.

Note that the "siloxane bond-containing polymer content" in Tables 1 and 2 is the parts by mass of the siloxane bond-containing polymer having a weight-average molecular weight of 3,000 or more and 700,000 or less as measured by GPC based on a total mass of 100 parts of the temporary adhesive material.

Note that although a glass plate was used as the support here in order to distinguish abnormalities after the substrate adhesion visually, a silicon substrate such as a wafer that does not transmit light can also be used.

The bonded substrate (sample) was subjected to the following tests. The results of the Examples and Comparative Examples are shown in Table 4. Additionally, evaluations were carried out in the order described below and stopped when the result was judged as "poor" without conducting the subsequent evaluations.

—Adhesion Test—

The laminate was heated at 180° C. for 1 hour by using an oven, then cooled to room temperature, and visually observed for the adhesion state of the interface. When no abnormality like bubbles was found at the interface, the laminate was evaluated as good, and expressed as "good". When an abnormality was found, the laminate was evaluated as poor, and expressed as "poor".

—Back Surface Grinding Resistance Test—

As described above, the laminate (sample) obtained by heat-curing in an oven at 180° C. for 1 hour was subjected to grinding of the back surface of the silicon wafer with a grinder (DAG810, manufactured by DISCO Co., Ltd.) using a diamond grinding wheel. After the wafer was ground to a final substrate thickness of 50 μm, abnormities such as cracks and separation were checked with an optical microscope (100-folds). When no abnormity was found, the result was expressed as "good", and when an abnormity was found, the result was expressed as "poor".

—CVD Resistance Test—

The wafer processing laminate after grinding the back surface of the silicon wafer was introduced into a CVD apparatus, subjected to an experiment to form a $SiO_2$ film with the thickness of 2 μm, and abnormities were visually checked. When no abnormality was found, the result was expressed as "good". When any of a void, scab on the wafer, breakage of the wafer, etc. was found, the result was expressed as "poor". The conditions of the CVD resistance test were as follows:

apparatus: plasma CVD PD270STL (manufactured by Samco Inc.)

RF: 500 W, internal pressure: 40 Pa

TEOS (tetraethyl orthosilicate):$O_2$=20 sccm:680 sccm.

—Separation Test—

Separation ability of the substrate was evaluated in the following manner. First, a dicing tape was stuck to the wafer side of the processed wafer after finishing the CVD resistance test, in which the wafer had been thinned to 50 μm, using a dicing frame. This dicing tape surface was set to a suction plate by vacuum suction. Then, one point of the glass was lifted by tweezers at room temperature to separate the glass substrate. When the glass substrate was successfully separated without cracking the 50-μm wafer, the result was expressed as "good". When an abnormality such as cracking occurred, the result was evaluated as poor, and expressed as "poor".

TABLE 1

| | Example 1 | Example 2 | Example 3 | Example 4 | Comparative Example 1 |
|---|---|---|---|---|---|
| Support coating layer 1 | C-1 | C-2 | B-2 | A-2 | A-1 |
| Heating temperature (° C.) | 150 | 150 | 160 | 180 | 150 |
| Heating time (min) | 5 | 5 | 3 | 5 | 5 |
| Film thickness (μm) | 10 | 5 | 30 | 50 | 30 |
| Minimum shear viscosity (Pa · s) | 6000 | 4000 | 200 | 30000 | 25000 |
| Support coating layer 2 | B-1 | A-1 | C-2 | C-1 | A-2 |
| Heating temperature (° C.) | 150 | 150 | 150 | 150 | 180 |
| Heating time (min) | 3 | 5 | 5 | 5 | 5 |
| Film thickness (μm) | 40 | 30 | 5 | 10 | 50 |
| Minimum shear viscosity (Pa · s) | 100 | 25000 | 4000 | 6000 | 30000 |
| Siloxane bond-containing polymer content (parts by mass) | 45 | 15 | 75 | 20 | 0 |

TABLE 2

| | Example 5 | Example 6 | Example 7 | Comparative Example 2 |
|---|---|---|---|---|
| Support coating layer | C-2 | C-1 | A-1 | B-2 |
| Heating temperature (° C.) | 150 | 150 | 150 | 150 |
| Heating time (min) | 5 | 5 | 5 | 3 |
| Film thickness (μm) | 5 | 10 | 30 | 40 |
| Minimum shear viscosity (Pa · s) | 4000 | 6000 | 25000 | 200 |
| Substrate coating layer | B-1 | A-1 | C-1 | B-2 |
| Heating temperature (° C.) | 150 | 150 | 150 | 160 |
| Heating time (min) | 3 | 5 | 5 | 3 |
| Film thickness (μm) | 40 | 30 | 10 | 30 |
| Minimum shear viscosity (Pa · s) | 100 | 25000 | 6000 | 200 |
| Siloxane bond-containing polymer content (parts by mass) | 40 | 25 | 25 | 30 |

TABLE 3

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Step (b) Heating temperature (° C.) | 70 | 100 | 50 | 80 | 40 | 80 | 80 | 100 | 50 |
| Step (c) Pressure (MPa) | 0.2 | 0.8 | 0.5 | 0.8 | 0.1 | 0.8 | 0.8 | 1.0 | 0.1 |
| Step (d) Heating temperature (° C.) | 150 | 230 | 160 | 220 | 140 | 200 | 200 | 250 | 160 |
| Step (d) Maintaining time (min) | 2 | 5 | 5 | 7 | 1 | 5 | 5 | 10 | 1 |

TABLE 4

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Adhesion | good | good | good | good | good | good | good | poor | Good |
| Back surface grinding property | good | good | good | good | good | good | good | — | good |

TABLE 4-continued

| | Example 1 | Example 2 | Example 3 | Example 4 | Example 5 | Example 6 | Example 7 | Comparative Example 1 | Comparative Example 2 |
|---|---|---|---|---|---|---|---|---|---|
| CVD resistance | good | good | good | good | good | good | good | — | good |
| Release property | good | good | good | good | good | good | good | — | poor |

As shown in Table 4, it was found that the temporary adhesive materials satisfying the requirements of the present invention made the temporary adhesion of a substrate and a support easier, and separation was also easier (Examples 1 to 7). On the other hand, in Comparative Examples 1 and 2 that do not satisfy the requirements of the present invention, there were problems with adhesion and release property. In particular, release property was poor in Comparative Example 2, in which the first temporary adhesive layer and the second temporary adhesive layer were not distinct, even though the shear viscosity range of the temporary adhesive layer was within the range of the present invention.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A temporary adhesive material for substrate processing for temporary adhesion of a substrate to a support on a surface of the substrate opposite to a surface to be processed, the material consisting of a first temporary adhesive layer and a second temporary adhesive layer:

the first temporary adhesive layer comprising a thermoplastic resin; and the second temporary adhesive layer that is distinct from the first temporary adhesive layer, where the temporary adhesive material has a two-layer structure of the first temporary adhesive layer and the second temporary adhesive layer, and one of the first temporary adhesive layer and the second temporary adhesive layer, is configured to be temporarily adhered to the support, and has a minimum shear viscosity of 4000 Pa·s or higher and 10,000 Pa·s or lower within a range of 130° C. to 250° C., wherein:

the temporary adhesive material contains 10 parts by mass or more and 100 parts by mass or less of a siloxane bond-containing polymer having a weight-average molecular weight of 3,000 or more and 700,000 or less as measured by GPC based on a total mass of 100 parts;

the thermoplastic resin does not contain organopolysiloxane and is selected from at least one of: an olefinic thermoplastic elastomer, a polybutadiene type thermoplastic elastomer, a styrenic thermoplastic elastomer, a styrene-butadiene type thermoplastic elastomer, a styrene-polyolefin type thermoplastic elastomer, and a hydrogenated polystyrene type elastomer; and the siloxane bond-containing polymer contains:

(p1) an organopolysiloxane having an alkenyl group in a molecule thereof and represented by the following formula (5) and/or formula (6), $$R^{13}_{(3-a)}X^1_aSiO—(R^{13}X^1SiO)_1—(R^{13}_2SiO)_r—SiR^{13}_{(3-a)}X^1_a \quad (5)$$

$$R^{13}_2(HO)SiO—(R^{13}X^1SiO)_{1+2}—(R^{13}_2SiO)_r—SiR^{13}_2(OH) \quad (6)$$

wherein each $R^{13}$ independently represents a monovalent hydrocarbon group having 1 to 10 carbon atoms and no aliphatic unsaturated bond; each $X^1$ independently represents a monovalent organic group having 2 to 10 carbon atoms and containing an alkenyl group; and "a" is an integer of 1 to 3; in the formula (5), 2a+1 is such a number that a content of alkenyl group is 0.3 to 10 mol % per molecule; in the formula (6), 1+2 is such a number that the content of alkenyl group is 0.3 to 10 mol % per molecule; "1" is 0 or a positive number of 500 or less, and "r" is a positive number of 1 to 10,000;

(p2) a trimethylsilyl terminated organohydrogenpolysiloxane having two or more silicon atom-bonded hydrogen atoms (Si—H groups) per molecule, in such an amount that a mole ratio of the Si—H group in the component (p2) to the alkenyl group in the component (p1) ranges from 1 to 8; and (p3) a platinum-based catalyst.

2. The temporary adhesive material for substrate processing according to claim 1, wherein the siloxane bond-containing polymer has a repeating unit shown by the following general formula (1):

(1)

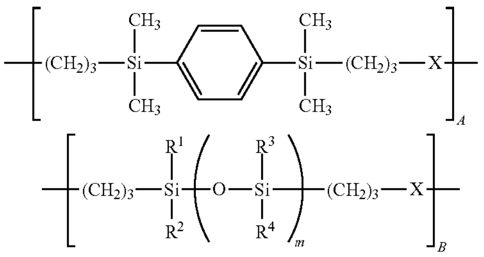

wherein $R^1$ to $R^4$ each independently represent the same or different monovalent hydrocarbon group having 1 to 8 carbon atoms; "m" is an integer of 1 to 100; B is a positive number, A is 0 or a positive number, provided that A+B=1; and X is a divalent organic group shown by the following general formula (2):

(2)

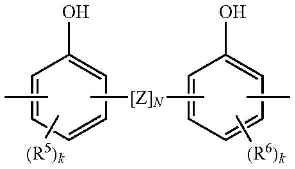

wherein Z represents a divalent organic group selected from any of

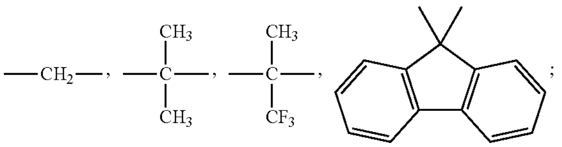

N represents 0 or 1; $R^5$ and $R^6$ each independently represent the same or different alkyl group or alkoxy group having 1 to 4 carbon atoms; and "k" represents any of 0, 1, and 2.

3. The temporary adhesive material for substrate processing according to claim 1, wherein the siloxane bond-containing polymer has a repeating unit shown by the following general formula (3):

(3)

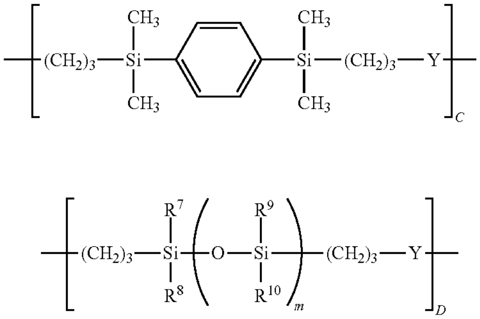

wherein $R^7$ to $R^{10}$ each independently represent the same or different monovalent hydrocarbon group having 1 to 8 carbon atoms; "n" is an integer of 1 to 100; D is a positive number, C is 0 or a positive number, provided that C+D=1; and Y is a divalent organic group shown by the following general formula (4):

(4)

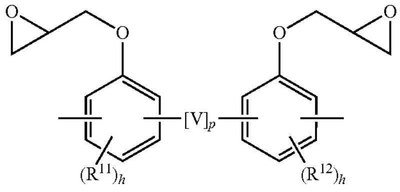

wherein V represents a divalent organic group selected from any of

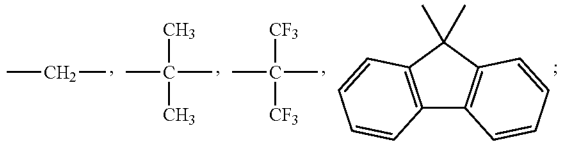

"p" represents 0 or 1; $R^{11}$ and $R^{12}$ each independently represent the same or different alkyl group or alkoxy group having 1 to 4 carbon atoms; and "h" represents any of 0, 1, and 2.

4. The temporary adhesive material for substrate processing according to claim 2, wherein the siloxane bond-containing polymer has a repeating unit shown by the following general formula (3):

(3)

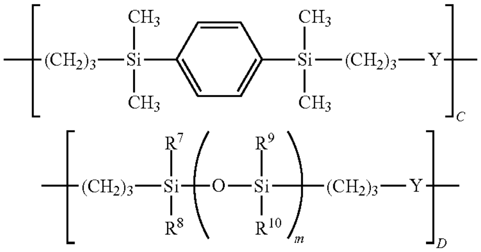

wherein $R^7$ to $R^{10}$ each independently represent the same or different monovalent hydrocarbon group having 1 to 8 carbon atoms; "n" is an integer of 1 to 100; D is a positive number, C is 0 or a positive number, provided that C+D=1; and Y is a divalent organic group shown by the following general formula (4):

(4)

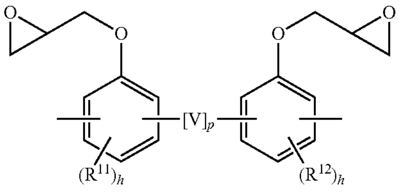

wherein V represents a divalent organic group selected from any of

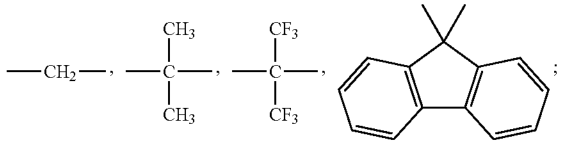

"p" represents 0 or 1; $R^{11}$ and $R^{12}$ each independently represent the same or different alkyl group or alkoxy group having 1 to 4 carbon atoms; and "h" represents any of 0, 1, and 2.

5. A method for manufacturing a laminate by bonding a substrate and a support through a temporary adhesive material, the method comprising the following steps (a) to (d):

(a) forming a temporary adhesive layer on a surface to be bonded of one or both of the substrate and the support by using the temporary adhesive material for substrate processing according to claim 1;

(b) heating one or both of the substrate and the support at a temperature of 30° C. or higher and 100° C. or lower in advance;

(c) keeping the substrate and the support in contact with each other through the temporary adhesive material under reduced pressure and applying a pressure of 1 MPa or lower; and (d) heating the substrate at a temperature of 130° C. or higher and 250° C. or lower while maintaining the pressure.

* * * * *